US 11,018,341 B2

(12) United States Patent
Serizawa

(10) Patent No.: US 11,018,341 B2
(45) Date of Patent: May 25, 2021

(54) BINDER COMPOSITION FOR SECONDARY BATTERY

(71) Applicant: NEC CORPORATION, Tokyo (JP)

(72) Inventor: Shin Serizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/493,916

(22) PCT Filed: Mar. 14, 2018

(86) PCT No.: PCT/JP2018/009936
§ 371 (c)(1),
(2) Date: Sep. 13, 2019

(87) PCT Pub. No.: WO2018/168916
PCT Pub. Date: Sep. 20, 2018

(65) Prior Publication Data
US 2020/0028175 A1    Jan. 23, 2020

(30) Foreign Application Priority Data

Mar. 15, 2017   (JP) .............................. JP2017-049362

(51) Int. Cl.
| | |
|---|---|
| *H01M 4/62* | (2006.01) |
| *C08G 73/10* | (2006.01) |
| *H01M 4/04* | (2006.01) |
| *H01M 4/38* | (2006.01) |
| *H01M 4/485* | (2010.01) |
| *H01M 10/0525* | (2010.01) |
| *C08L 79/08* | (2006.01) |

(52) U.S. Cl.
CPC .......... *H01M 4/622* (2013.01); *C08G 73/105* (2013.01); *C08G 73/1082* (2013.01); *C08L 79/08* (2013.01); *H01M 4/0404* (2013.01); *H01M 4/386* (2013.01); *H01M 4/485* (2013.01); *H01M 10/0525* (2013.01); *H01M 2220/20* (2013.01)

(58) Field of Classification Search
CPC . H01M 4/622; C08G 73/1042; C08G 73/105; C08L 79/08
See application file for complete search history.

(56) References Cited

U.S. PATENT DOCUMENTS

2006/0099506 A1   5/2006  Krause et al.
2013/0323587 A1*  12/2013 Kose .................. C08G 73/1071
                                                         429/211

FOREIGN PATENT DOCUMENTS

| JP | 06-163031 A | 6/1994 |
| JP | 07-138479 A | 5/1995 |
| JP | 2006-016592 A | 1/2006 |
| JP | 2011-076901 A | 4/2011 |
| JP | 2013-004371 A | 1/2013 |
| JP | 2014-078416 A | 5/2014 |
| WO | 2015/046304 A1 | 4/2015 |
| WO | 2017/047778 A1 | 3/2017 |

OTHER PUBLICATIONS

International Search Report for PCT/JP2018/009936, dated May 1, 2018.

* cited by examiner

*Primary Examiner* — Ladan Mohaddes
(74) *Attorney, Agent, or Firm* — Sughrue Mion, PLLC

(57) ABSTRACT

A purpose of the present invention is to provide a binder composition for a secondary battery which can impart excellent battery characteristics, even when the heat treatment temperature is low. The binder composition for a secondary battery according to the present invention is characterized by comprising a polyamic acid comprising a repeating unit represented by chemical formula (1) and an aromatic compound comprising an electron donating group and an organic acid group, Chemical formula (1)

$$\left( \begin{array}{c} HOOC \\ \diagup \\ N \\ | \\ H \end{array} \!\! \begin{array}{c} O\ H \\ \| \ | \\ C\!-\!N\!-\!B \\ A \\ C \\ \| \\ O \end{array} \!\! \begin{array}{c} \\ \\ COOH \end{array} \right)$$

wherein A is a tetravalent group obtained by removing acid anhydride groups from a tetracarboxylic dianhydride, B is a divalent group obtained by removing amino groups from a diamine, and at least one of A and B is an aliphatic group.

9 Claims, 1 Drawing Sheet

BINDER COMPOSITION FOR SECONDARY BATTERY

This application is a National Stage of International Application No. PCT/JP2018/009936 filed Mar. 14, 2018, claiming priority based on Japanese Patent Application No. JP 2017-049362 filed Mar. 15, 2017, and the entire disclosure of which is hereby incorporated by reference.

TECHNICAL FIELD

The present invention relates to a binder composition for a secondary battery, and a secondary battery comprising this.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power supplies for driving automobiles and motorcycles, and storage cells for smart grids, have attracted attention. As demand for lithium ion secondary batteries is increased and the batteries are used in more various fields, characteristics, such as higher battery energy density, lifetime characteristics which enable-long term use, and usability in a wide range of temperature conditions, are demanded.

Carbon materials are generally used in a negative electrode of the lithium ion secondary battery, but it has been studied to use silicon materials having large capability of absorbing and releasing lithium ions per unit volume in the negative electrode in order to enhance the energy density of the battery. However, there has been a problem in that the silicon materials expand and contract by repeating charge and discharge, causing breakage of the active material layer and peeling of active materials from the current collector, which deteriorate the cycle characteristics of the battery.

In order to solve this problem, a polyimide resin having higher mechanical strength is used as a binder in a negative electrode comprising a silicon material. Patent document 1 discloses a polyimide obtained from an aromatic diamine and an aromatic tetracarboxylic dianhydride as a specific example of the polyimide resin. Patent document 2 discloses a polyimide resin obtained from an aromatic diamine and an aliphatic tetracarboxylic acid. Patent document 3 discloses a polyimide resin obtained from an alicyclic diamine and an aromatic tetracarboxylic acid.

CITATION LIST

Patent Literature

Patent document 1: Japanese patent laid-open No. 116-163031
Patent document 2: US patent laid-open No. 2006/0099506
Patent document 3: Japanese patent laid-open No. 2014-78416

SUMMARY OF INVENTION

Technical Problem

In general, the polyimide binder is obtained by heat-treating a polyamic acid in an electrode mixture paste, and this heat treatment requires that the electrode mixture paste is exposed to a high temperature such as 400° C. This is because the reaction from a polyamic acid to a polyimide does not proceed in the heat treatment at a low temperature, so that problems such as significant deterioration in battery characteristics arise when it is used in a battery. In addition, since the heat treatment increases the manufacturing cost of the battery and requires a heating device for exposing the electrode to high temperature conditions as manufacturing equipment, the heat treatment at lower temperature is desired.

In view of the above problem, a purpose of the present invention is to provide a binder composition for a secondary battery which can impart excellent battery characteristics, even when the heat treatment temperature is low.

Solution to Problem

The first binder composition for a secondary battery of the present invention is characterized in comprising a polyamic acid comprising a repeating unit represented by chemical formula (1) and an aromatic compound comprising an electron donating group and an organic acid group.

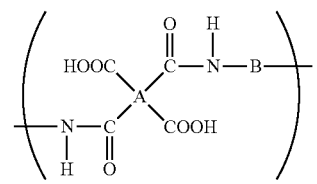

Chemical formula (1)

In chemical formula (1), A is a tetravalent group obtained by removing acid anhydride groups from a tetracarboxylic dianhydride, B is a divalent group obtained by removing amino groups from a diamine, and at least one of A and B is an aliphatic group.

Advantageous Effects of Invention

According to one embodiment of the present invention, it is possible to provide a binder composition for a secondary battery which can impart excellent battery characteristics, even when the heat treatment temperature is low.

Figure 1:
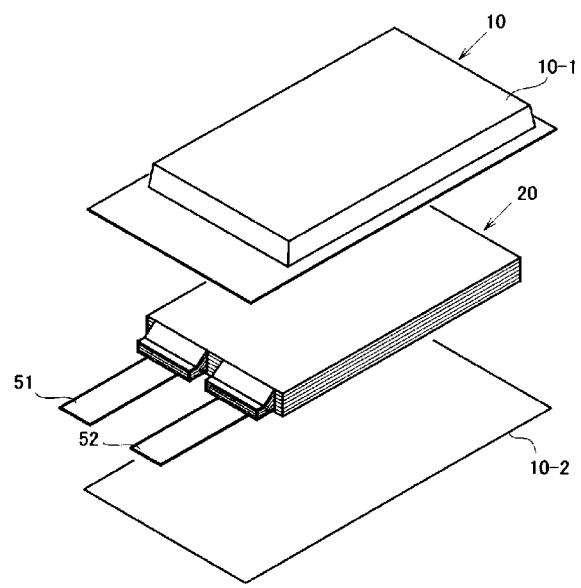
FIG. 1 is an exploded perspective view showing a basic structure of a film package battery.

DESCRIPTION OF EMBODIMENTS (1) Binder Composition for Secondary Battery

In the present embodiment, the binder composition for a secondary battery comprises a polyamic acid and an aromatic compound comprising an electron donating group and an organic acid group. This binder composition for a secondary battery can be used as a polyimide binder in an electrode of a secondary battery. The binder composition for a secondary battery may further comprise a solvent.

<Polyamic Acid>

The polyamic acid comprises a repeating unit represented by the following chemical formula (1).

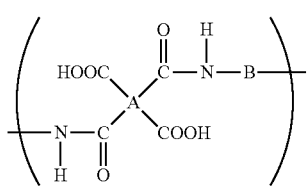

Chemical formula (1)

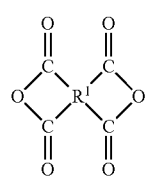

Chemical formula (2)

In chemical formula (1), A is a tetravalent group obtained by removing acid anhydride groups from a tetracarboxylic dianhydride, B is a divalent group obtained by removing amino groups from a diamine, and at least one of A and B is an aliphatic group.

These repeating units are determined by the structures of tetracarboxylic dianhydride and diamine that are the raw materials. Accordingly, such a repeating unit can also be represented in the form of "a repeating unit consisting of a skeleton based on a tetracarboxylic dianhydride and a skeleton based on a diamine" by raw material names.

The aliphatic group is not particularly limited, may be linear or branched, and may be saturated or unsaturated. The carbon number of the aliphatic group may be, for example, 1 to 27 or 2 to 18. The aliphatic group may comprise elements other than carbon and hydrogen, such as oxygen, sulfur, and halogens.

The aliphatic group is preferably an alicyclic group, which has at least one ring. When the polymer main chain has rings, the binder may have high strength, improving cycle characteristics of a battery. The alicyclic group preferably comprises an aliphatic ring having 3 to 10 carbon atoms, more preferably an aliphatic ring having 5 to 7 carbon atoms. Examples of such aliphatic rings include cyclopropane, cyclobutane, cyclopentane, cyclohexane, cycloheptane and the like. The aliphatic ring may contain a double bond. Examples of such aliphatic rings include cyclopropene, cyclobutene, cyclopentene, cyclopentadiene, cyclohexene, cyclohexadiene, cycloheptene, cycloheptadiene and the like. Some or all of the hydrogen atoms on the aliphatic ring may be substituted with fluorine group, methyl group, methoxy group, trifluoromethyl group, trifluoromethoxy group or the like. In place of a methylene group (—CH$_2$—), a group such as —C(=O)— or —O— may be provided on the aliphatic ring. A group that cross-links the aliphatic ring may be provided. The alicyclic group may comprise a plurality of aliphatic rings, and may be a condensed polycyclic aliphatic group or a non-condensed polycyclic aliphatic group in which cycloaliphatic groups are linked to each other either directly or via a crosslinking member (for example, —O—, —S—, —CH$_2$—, —C(CH$_3$)$_2$— or the like). Among these, alicyclic groups comprising a cyclohexane ring are especially preferred. Examples of such alicyclic groups include those comprising a cross-linked cyclohexane ring, such as norbornane. The aliphatic ring may directly bond to a carboxyl group (—COOH) and an amide group (—C(=O)NH—), and may bond to a carboxyl group (—COOH) and an amide group (—C(=O)NH—) via linkage groups such as alkylene groups having 1 to 5 carbon atoms, for example, methylene group and ethylene group.

When A is an alicyclic group, the alicyclic tetracarboxylic dianhydride for forming A is preferably represented by chemical formula (2).

In chemical formula (2), R$^1$ represents a monocyclic aliphatic group, a condensed polycyclic aliphatic group, or a non-condensed polycyclic aliphatic group in which cycloaliphatic groups are linked to each other either directly or via a crosslinking member.

In chemical formula (2), R$^1$ is preferably a tetravalent group having 4 to 27 carbon atoms.

Examples of the alicyclic tetracarboxylic dianhydride include cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarbocxylic dianhydride, bicycle[2.2.2]oct-7-ene-2,3,5,6-tetracarboxylic dianhydride, bicycle[2.2.2]octane-2,3,5,6-tetracarboxylic dianhydride, 2,3,5-tricarboxycyclopentylacetic dianhydride, bicycle[2.2.1]heptane-2,3,5-tricarboxylic-6-acetic dianhydride, 1-methyl-3-ethylcyclohexa-1-ene-3-(1,2),5,6-tetracarboxylic dianhydride, decahydro-1,4,5,8-dimethanonaphtalene-2,3,6,7-tetracarboxylic dianhydride, 442,5-dioxotetrahydrofuran-3-ylketralin-1,2-dicarboxylic dianhydride, 3,3',4,4'-dicyclohexyltetracarboxylic dianhydride, octahydropentalene-1,3,4,6-tetracarboxylic dianhydride, tricyclo[4.2.2.02,5]decane-3,4,7,8-tetracarboxylic dianhydride, tricyclo[4.2.2.02,5]deca-7-ene-3,4,9,10-tetracarboxylic dianhydride, 9-oxatricyclo[4.2.1.02,5]nonane-3,4,7,8-tetracarboxylic dianhydride, decahydro-1,4:5,8-dimethanonaphtalene-2,3,6,7-tetracarboxylic dianhydride, (4arH,8acH)-decahydro-1t,4t:5c,8c-dimethanonaphthalene-2t,3t,6c,7c-tetracarboxylic dianhydride, norbornane-2-spiro-α-cyclopentanone-α'-spiro-2"-norbornane-5,5",6,6"-tetracarboxylic dianhydride and the like.

When A is a linear or branched aliphatic group, examples of the aliphatic tetracarboxylic dianhydride for forming A include ethane tetracarboxylic dianhydride, 1,2,3,4-butane tetracarboxylic dianhydride, ethylenediaminetetraacetic dianhydride and the like.

When B is an alicyclic group, examples of the alicyclic diamine for forming B include cyclobutanediamine, cyclohexane diamine, bis(aminomethyl)cyclohexane, diaminobicycloheptane, diaminomethylbicycloheptane (including norbornanediamines such as norbornanediamine), diaminooxybicycloheptane, diaminomethyloxybicycloheptane (including oxanorbornanediamine), isophoronediamine, diaminotricyclodecane, diaminomethyltricyclodecane, bis(aminocyclohexyl)methane (or methylenebis (cyclohexylamine)), and bis(aminocyclohexyl) isopropylidene.

In one aspect, the alicyclic diamine may have a structure represented by chemical formula (3).

NH$_2$—(CH$_2$)$_n$—R$^2$—(CH$_2$)$_m$—NH$_2$     Chemical formula (3)

In chemical formula (3), R$^2$ represents an alicyclic group, and n and m each independently represent the number of repeating units selected from 1 to 5.

In chemical formula (3), n and m are preferably each independently 1 or 2 and most preferably 1. Although the reason is unclear, it is thought that the structure in which a linear hydrocarbon group such as methylene bonds to a ring improves the flexibility of the binder, making it possible for the binder to withstand the stress due to the active material expanding and contracting during cycles, and the structure also decreases the ability of forming a charge transfer complex and the ability of the diffusion of Li in the binder or between the binders, preventing the ring-opening of imide rings caused by Li being occluded and diffused into the binder.

In chemical formula (3), $R^2$ is preferably a monocyclic aliphatic group, a condensed polycyclic aliphatic group, or a non-condensed polycyclic aliphatic group in which cycloaliphatic groups are linked to each other directly or via a crosslinking member. The carbon number of $R^2$ is preferably 3 to 27, and more preferably 4 to 10. $R^2$ may have a substituent such as a hydrocarbon group such as methyl group or ethyl group, a halogen such as fluorine or chlorine, or the like. A heteroatom such as O or S may be present in part of the ring, and may be a crosslinking member or part of a crosslinking member.

Preferably, $R^2$ has a structure comprising a cyclohexane ring. Although the reason why this structure is preferable is not clear, it is thought that the cyclohexane structure makes it possible for the binder to withstand the stress due to the active material expanding and contracting during cycles, and the structure also decreases the ability of forming a charge transfer complex in the binder or between the binders, preventing the ring-opening of imide rings caused by Li being occluded and diffused into the binder.

Examples of the alicyclic diamine represented by chemical formula (3) include bis(aminomethyl)cyclohexane, diaminomethylbicycloheptane (including norbornanethamines such as norbornanediamine), diaminomethyloxybicycloheptane (including oxanorbornanediamine), diaminomethyltricyclodecane, and the like.

Among these, compounds represented by the following chemical formula (3-1) or (3-2) are particularly preferred.

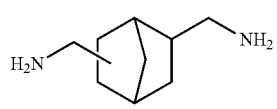

Chemical formula (3-1)

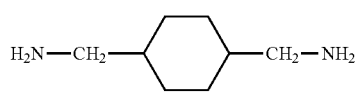

Chemical formula (3-2)

The position of the aminomethyl group of the norbornanediamine represented by chemical formula (3-1) is not particularly limited. For example, the norbornanediamine represented by chemical formula (3-1) may include structural isomers having different aminomethyl group positions, optical isomers including S and R-isomers, and the like. These may be contained in any ratio.

The 1,4-bismethylenecyclohexane skeleton in 1,4-bis(aminomethyl)cyclohexane represented by chemical formula (3-2) includes two kinds of geometric isomers (cis-isomer/trans-isomer). The trans-isomer is represented by the following chemical formula (X1) and the cis-isomer is represented by the following chemical formula (X2).

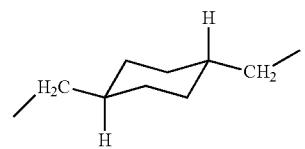

Chemical formula (X1)

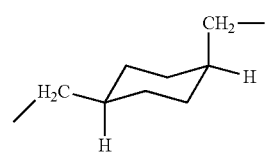

Chemical formula (X2)

The cis/trans ratio in chemical formula (3-2) is preferably 40/60 to 0/100 and more preferably 20/80 to 0/100. The glass transition temperature of the polyimide comprising the diamine residue derived from chemical formula (3-2) is controlled by the cis/trans ratio, and as the ratio of the trans-isomer (X1) increases, the glass transition temperature of the polyimide is higher. The cis/trans ratio can be measured by nuclear magnetic resonance spectroscopy.

As the alicyclic diamine, one compound may be used alone, or a plurality of compounds may be used in combination. For example, only one skeleton based on the alicyclic diamine represented by the above chemical formula (3-1) or (3-2) may be contained, and two or more thereof may be contained.

When B is a linear or branched aliphatic group, examples of the aliphatic diamine for forming B include ethylene glycol diamines and alkylene diamines.

Examples of the ethylene glycol diamines include bis(aminomethyl)ether, bis(2-aminoethyl)ether, bis(3-aminopropyl)ether, bis[(2-aminomethoxy)ethyl]ether, bis[2-(2-aminoethoxy)ethyl]ether, bis[2-(3-aminopropoxy)ethyl]ether, 1,2-bis(aminomethoxy)ethane, 1,2-bis(2-aminoethoxy)ethane, 1,2-bis[2-(aminomethoxy)ethoxy]ethane, 1,2-bis[2-(2-aminoethoxy)ethoxy]ethane, ethylene glycol bis(3-aminopropyl)ether, diethylene glycol bis(3-aminopropyl)ether, and triethylene glycol bis(3-aminopropyl)ether.

Examples of the alkylene diamines include ethylene diamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, and 1,12-diaminododecane.

In the present embodiment, it is preferred that one of A and B in chemical formula (1) is an aromatic group. That is, the polyamic acid preferably contains a repeating unit in which one of A and B is an aliphatic group and the other is an aromatic group. A polyimide obtainable from the polyamic acid comprising such a repeating unit containing an aromatic group and an aliphatic group can improve battery characteristics.

The aromatic group preferably comprises an aromatic ring having 4 to 14 carbon atoms, more preferably an aromatic ring having 6 to 10 carbon atoms. Examples of such an aromatic ring include benzene, naphthalene, anthracene and the like. Among these, benzene is preferred. The aromatic group may comprises a plurality of these aromatic rings, and may be a condensed polycyclic aromatic group or a non-condensed polycyclic aromatic group in which aromatic groups are linked to each other directly or via a crosslinking member (for example, —O—, —S—, —$CH_2$—, —$C(CH_3)_2$— or the like).

The carbon number of the aromatic group may be, for example, 4 to 27 or 6 to 20. Some or all of the hydrogen atoms on the aromatic ring may be substituted with a fluorine group, a methyl group, a methoxy group, a trifluoromethyl group, a trifluoromethoxy group or the like.

The aromatic ring may directly bond to a carboxyl group (—COOH) and an amide group (—C(=O)NH—), and may bond to a carboxyl group (—COOH) and an amide group (—C(=O)NH—) via linkage groups such as alkylene groups having 1 to 5 carbon atoms, for example, methylene group and ethylene group.

When A is an aromatic group, the aromatic tetracarboxylic dianhydride for forming A is preferably represented by chemical formula (4).

Chemical formula (4)

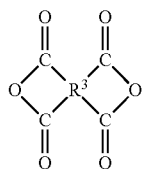

In chemical formula (4), $R^3$ represents a monocyclic aromatic group, a condensed polycyclic aromatic group, or a non-condensed polycyclic aromatic group in which aromatic groups are linked to each other directly or via a crosslinking member.

In chemical formula (4), $R^3$ is preferably a tetravalent group having 4 to 27 carbon atoms.

Examples of the tetracarboxylic dianhydride represented by chemical formula (4), containing an aromatic ring, include pyromellitic dianhydride, 3,3',4,4'-biphenyltetracarboxylic dianhydride, 3,3',4,4'-benzophenonetetracarboxyic dianhydride, bis(3,4-dicarboxyphenyl)ether dianhydride, bis(3,4-dicarboxyphenyl)sulfide dianhydride, bis(3,4-dicarboxyphenyl)sulfone dianhydride, bis(3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, 1,3-bis(3,4-dicarboxyphenoxy)benzene dianhydride, 1,4-bis(3,4-dicarboxyphenoxy)benzene dianhydride, 4,4'-bis(3,4-dicarboxyphenoxy)biphenyl dianhydride, 2,2-bis[(3,4-dicarboxyphenoxy)phenyl] propane dianhydride, 2,3,6,7-naphthalenetetracarboxylic dianhydride, 1,4,5,8-naphthalenetetracarboxylic dianhydride, 2,2',3,3'-benzophenonetetracarboxylic dianhydride, 2,2',3,3'-biphenyltetracarboxylic dianhydride, 2,2-bis(2,3-dicarboxyphenyl)propane dianhydride, 2,2-bis(2,3-dicarboxyphenyl)-1,1,1,3,3,3-hexafluoropropane dianhydride, bis(2,3-dicarboxyphenyl)ether dianhydride, bis(2,3-dicarboxyphenyl)sulfide dianhydride, bis(2,3-dicarboxyphenyl)sulfone dianhydride, 1,3-bis(2,3-dicarboxyphenoxy)benzene dianhydride, 1,4-bis(2,3-dicarboxyphenoxy)benzene dianhydride, 1,2,5,6-naphtalenetetracarboxylic dianhydride, 1,3-bis(3,4-dicarboxybenzoyl)benzene dianhydride, 1,4-bis(3,4-dicarboxybenzoyl)benzene dianhydride, 1,3-bis(2,3-dicarboxybenzoyl)benzene dianhydride, 1,4-bis(2,3-dicarboxybenzoyl)benzene dianhydride, 4,4'-isophthaloyldiphthalic anhydride, diazodiphenylmethane-3,3',4,4'-tetracarboxylic dianhydride, diazodiphenylmethane-2,2',3,3'-tetracarboxylic dianhydride, 2,3,6,7-thioxanthonetetracarboxylic dianhydride, 2,3,6,7-anthraquinonetetracarboxylic dianhydride, and 2,3,6,7-xantonetetracarboxylic dianhydride.

A fluorine-containing aromatic tetracarboxylic dianhydride may be used. Examples of the fluorine-containing aromatic tetracarboxylic dianhydride may include 4,4'-(hexafluoroisopropylidene)diphthalic anhydride, 3,3'-(hexafluoroisopropylidene)diphthalic anhydride, 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)propylidene]diphthalic anhydride, 1H diflo difluoro [3,4-b: 3',4'-i]xanthene-1,3,7,9(11H)-tetron, 5,5'-oxybis[4,6,7-trifluoropyromelliticanhydride], 3,6-bis(trifluoromethyl)pyromellitic dianhydride, 4-(trifluoromethyl)pyromellitic dianhydride, 1,4-difluoropyromellitic dianhydride, and 1,4-bis(3,4-dicarboxytrifluorophenoxy)tetrafluorobenzene dianhydride.

When B is an aromatic group, examples of the aromatic diamine for forming B include:

<1> diamines having one benzene ring, such as p-phenylenediamine, m-phnylenediamine, p-xylylenediamine, and m-xylylenediamine;

<2> diamines having two benzene rings, such as 4,4'-diaminobipenyl (benzidine), 4,4'-diamino-2,2'-dimethylbiphenyl (m-tolidine), 4,4'-diamino-3,3'-dimethylbiphenyl (o-tolidine), 3,3'-diaminodiphenylether, 3,4'-diaminodiphenylether, 4,4'-diaminodiphenylether, 4,4'-diaminobenzanilide, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, 2,2-di(3-aminophenyl)propane, 2,2-di(4-aminophenyl)propane, 2-(3-aminophenyl)-2-(4-aminophenyl)propane, 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoropropane, 1,1-di(3-aminophenyl)-1-phenylethane, 1,1-di(4-aminophenyl)-1-phenylethane, and 1-(3-aminophenyl)-1-(4-aminophenyl)-1-phenylethane;

<3> diamines having three benzene rings, such as 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzyl)benzene, 1,4-bis(4-amino-α,α-ditrifluoromethylbenzylkenzene, 2,6-bis(3-aminophenoxy)benzonitrile, and 2,6-bis(3-aminophenoxy)pyridine;

<4> diamines having four benzene rings, such as 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, and 2,2-bis[4-(4-aminophenoxy)phenyl]-1,1,1,3,3,3-hexafluoropropane;

<5> diamines having five benzene rings, such as 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, and 1,4-bis[4-(4-aminophenoxy)-α,α-dimethylbenzyl]benzene; and <6> diamines having six benzene rings, such as 4,4'-bis[4-(4-aminophenoxy)benzoyl]diphenylether, 4,4'-bis[4-(4-amino-α,α-dimethylbenzyl)phenoxy]benzophenone, 4,4'-bis[4-(4-amino-α,α-dimethylbenzyl)phenoxy]diphenylsulfone, and 4,4'-bis[4-(4-aminophenoxy)phenoxy]diphenylsulfone.

In addition, examples of the diamine with an aromatic substituent include 3,3'-diamino-4,4'-diphenoxybenzophenone, 3,3'-diamino-4,4'-dibiphenoxybenzophenone, 3,3'-diamino-4-phenoxybenzophenone, and 3,3'-diamino-4-biphenoxybenzophenone.

Aromatic diamines containing a fluorine group may be also used. Examples thereof include 2,2'-bis(trifluoromethyl)-4,4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene(dimethaneamine), 2,2'-difluoro-(1,1'-biphenyl)-4,4'-diamine, 2,2',6,6'-tetrafluoro-(1,1'-biphenyl)-4,4'-diamine, 4,4'-diaminooctafluorobiphenyl, 2,2-bis(4-aminophenyl)hexafluoropropane, 4,4'-oxybis(2,3,5,6-tetrafluoroaniline) and the like.

Several types of polyamic acids may be used in combination. For example, a polyamic acid comprising a repeating unit consisting of a skeleton based on an aromatic tetracarboxylic dianhydride and a skeleton based on an alicyclic diamine, and a polyamic acid comprising a repeating unit consisting of a skeleton based on an alicyclic tetracarboxylic dianhydride and a skeleton based on an aromatic diamine may be used in combination. Also, the polyamic acid may comprise both a repeating unit consisting of a skeleton based on an aromatic tetracarboxylic dianhydride and a skeleton based on an alicyclic diamine and a repeating unit consisting of a skeleton based on an alicyclic tetracarboxylic dianhydride and a skeleton based on an aromatic diamine.

In the polyamic acid according to the present embodiment, the ratio of the number of the repeating units represented by chemical formula (1) to the total number of repeating units is preferably 50% or more, more preferably 80% or more, and may be 100%.

The binder composition for a secondary battery according to the present invention may comprise other polymers in addition to the above polyamic acid. For example, the binder composition for a secondary battery may comprise a polyamic acid consisting of repeating units consisting of a skeleton based on an aromatic tetracarboxylic dianhydride and a skeleton based on an aromatic diamine. The aromatic tetracarboxylic dianhydride and the aromatic diamine include those described above. In the binder composition for a secondary battery, the amount of the polyamic acid comprising the repeating unit represented by chemical formula (1) is preferably 50 mass % or more, more preferably 70 mass % or more, and may be 100 mass % of the total amount of polyamic acids.

<Aromatic Compound>

The aromatic compound comprises an electron donating group and an organic acid group. The electron donating group is preferably a group having a negative Hammett substituent constant when it is substituted at the para position of benzoic acid. Examples of the electron donating group include alkyl group, alkoxy group, amino group, hydroxyl group, mercapto group, alkylthio group, and the like. Among them, alkyl group and hydroxyl group are particularly preferred, and hydroxyl group is most preferred. When the electron donating group is alkyl group, alkoxy group or alkylthio group, the carbon number is preferably 1 to 5, more preferably 1 to 3, and further preferably 1. The number of the electron donating groups present in the aromatic compound may be one or more. Preferably, the number of the electron donating groups is one.

Examples of the organic acid group include carboxyl group, sulfo group, and phosphate group. Among them, carboxyl group is particularly preferred. The number of the organic acid groups present in the aromatic compound may be one or more, preferably one or two, and most preferably one. When the organic acid groups are present in the aromatic compound in excess, they react with the polyamic acid three dimensionally, causing gelation in some cases. To prevent this, it is preferable to set the number of the organic acid groups in the aromatic compound to two or less. When two or more of the organic acid groups are present in the aromatic compound, the organic acid groups are preferably substituted at positions away from each other, for example, in meta relation, para relation or the like in the case of benzene ring. It is possible to prevent the organic acid groups of the aromatic compound from undergoing intramolecular condensation by arranging the organic acid groups at positions away from each other.

Preferred aromatic compounds are those in which hydrogens of the aromatic ring(s) have been directly substituted with the electron donating group and the organic acid group. Examples of the aromatic ring skeleton include benzene, biphenyl, naphthalene and the like. Among them, benzene has a low molecular weight and is preferred for increasing the energy density of the battery.

Examples of the preferred aromatic compound include hydroxybenzoic acid, aminobenzoic acid, alkylbenzoic acid, mercaptobenzoic acid, alkoxybenzoic acid, alkylthiobenzoic acid, hydroxybiphenyl carboxylic acid, aminobiphenyl carboxylic acid, alkylbiphenyl carboxylic acid, mercaptobiphenyl carboxylic acid, alkoxybiphenyl carboxylic acid, alkylthiobiphenyl carboxylic acid, hydroxynaphthalenecarboxylic acid, aminonaphthalenecarboxylic acid, alkylnaphthalenecarboxylic acid, mercaptonaphthalenecarboxylic acid, alkoxynaphthalenecarboxylic acid, alkylthionaphthalenecarboxylic acid, and the like. The substitution positions of the electron donating group and the organic acid group in these compounds are not particularly limited, but the compounds substituted with the electron donating group and the organic acid group at positions away from each other are more preferred. When the skeleton of the aromatic compound is benzene, the compounds in which the electron donating group and the organic acid group are in meta relation or para relation, especially in para relation are preferred. When the skeleton of the aromatic compound is biphenyl, the compounds in which the electron donating group and the organic acid group are at 4,4' position, 3,4' position, or 3,3' position, especially at 4,4' position are preferred. When the skeleton of the aromatic compound is naphthalene, the compounds in which the electron donating group and the organic acid group are at 2,6 position, 2,7 position, or 2,4 position, especially at 2,6 position are preferred.

In the binder composition for a secondary battery, the aromatic compound is preferably contained in an amount of 60 mass % or less, more preferably 30 mass % or less, based on the mass of the polyamic acid. In addition, in the binder composition for a secondary battery, the aromatic compound is preferably contained in an amount of 0.01 mass % or more, more preferably 0.1 mass % or more, based on the mass of the polyamic acid. The polyamic acid is commercially available as a solution in some cases, but herein, the mass of the polyamic acid does not include the mass of components other than the polyamic acid, such as solvents.

More specifically, since the reactivity of the aromatic compound depends on the electron donating group and the organic acid group, the appropriate amount may differ for each aromatic compound. For example, in the binder composition for a secondary battery, the aromatic compound may be preferably contained in an amount of 20 mass % or less, more preferably 10 mass % or less, based on the mass of the polyamic acid. For example, in the binder composition for a secondary battery, the aromatic compound may be preferably contained in an amount of 6 mass % or less, more preferably 3 mass % or less, based on the mass of the polyamic acid. For example, in the binder composition for a secondary battery, the aromatic compound may be preferably contained in an amount of 0.5 mass % or more, more preferably 1.5 mass % or more, based on the mass of the polyamic acid.

When the binder composition for a secondary battery comprises the aromatic compound, the reaction from polyamic acid to polyimide can proceed even in the heat treatment at low temperature. In particular, the aromatic compound can further promote the reaction from polyamic acid to polyimide in an appropriate amount. For this reason, even in the case of the heat treatment at low temperature, the binder has high bonding strength, which improves the cycle characteristics of the produced secondary battery. In addition, the aromatic compound also has the effect of preventing cleavage of imide bonds caused by the reaction between carbonyl group of the polyimide and Li.

<Solvent>

A polyamic acid-containing solution can be obtained by reacting a tetracarboxylic acid dianhydride with a diamine in a solvent. The binder composition for a secondary battery may be such a polyamic acid-containing solution. The solvent is not particularly limited as long as it is a solvent capable of dissolving the aforementioned tetracarboxylic dianhydride and diamine. For example, the solvent may be an aprotic polar solvent, an ether compound, a water-soluble alcohol solvent, or the like.

Examples of the aprotic polar solvent include N-methyl-2-pyrrolidone, N,N-dimethylformamide, N,N-dimethylacetamide, dimethylsulfoxide, hexamethylphosphoramide, and 1,3-dimethyl-2-imidazolidinone.

Examples of the ether compound include 2-methoxyethanol, 2-ethoxyethanol, 2-(methoxymethoxy)ethoxyethanol, 2-isopropoxyethanol, 2-butoxyethanol, tetrahydrofurfurylalcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol, tetrahydrofuran, dioxane, 1,2-dimethoxyethane, diethylene glycol dimethyl ether, and diethylene glycol diethyl ether.

Examples of the water-soluble alcohol solvent include methanol, ethanol, 1-propanol, 2-propanol, tert-butylalcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, 1,2,6-hexanetriol, and diacetonealcohol.

The polyamic acid-containing solution may comprises either only one solvent or two or more solvents. Among these solvents, N,N-dimethylacetamide, N-methyl-2-pyrrolidone, and a mixture thereof are preferred.

The polyamic acid-containing solution is obtained by reacting the aforementioned tetracarboxylic dianhydride with the aforementioned diamine in a solvent. When the number of moles of the diamine in the solvent is referred to as x and the number of moles of the tetracarboxylic dianhydride is referred to as y, y/x is preferably 0.9 to 1.1, more preferably 0.95 to 1.05, further preferably 0.97 to 1.03, and particularly preferably 0.99 to 1.01. By polymerizing the tetracarboxylic dianhydride and the diamine at such a ratio, the molecular weight (polymerization degree) of the polyamic acid can be adjusted moderately.

There are no particular limitations on the polymerization reaction procedure. First, for example, a vessel equipped with a stirrer and a nitrogen inlet tube is prepared. A solvent is placed in the vessel purged with nitrogen, and a diamine is added in such an amount that the solid concentration of the resulting polyamic acid will be 50 mass % or less, followed by temperature adjustment and stirring for dissolution. An equimolar amount of a tetracarboxylic dianhydride with respect to the diamine is added to the solution, followed by adjusting temperature and stirring the solution for about 1 to 50 hours to yield a polyamic acid-containing solution.

The polyamic acid prepared as above is obtained in a solution state. The polyamic acid may be used in the binder composition for a secondary battery after isolated, for example, by the method of pouring the solution into a poor solvent to obtain a precipitate thereof (which may be dissolved in a predetermined solvent again). Alternatively, the prepared solution may be used as it is or after simply diluted in the binder composition for a secondary battery. From the standpoint of productivity and cost, it is preferred to use the resulting polyamic acid solution as it is without isolation.

When a block poly(amic acid imide) is prepared from the polyamic acid, the poly(amic acid imide) may be obtained, for example, by adding a solution of an acid anhydride-terminated polyimide to a solution of an amine-terminated polyamic acid, followed by stirring. The polyamic acid is prepared by the aforementioned method.

The amount of the polyamic acid contained in the polyamic acid-containing solution is preferably 1 to 50 mass %, and more preferably 20 to 45 mass %. When the concentration of the polyamic acid in a solution exceeds 50 mass %, the viscosity of the polyamic acid-containing solution becomes excessively high, sometimes making it difficult to coat a substrate with it. On the other hand, when the concentration of the polyamic acid is less than 1 mass %, the viscosity of the polyamic acid-containing solution becomes excessively low, making it difficult to adjust the viscosity of the electrode mixture paste for a secondary battery. In addition, it takes time to dry the solvent, and the production efficiency of the electrode is degraded.

Water may be used as a solvent. The polyamic acid can be easily prepared by reacting the tetracarboxylic dianhydride and the diamine in water as a solvent in the presence of an imidazole. In this case, in addition to water, an organic solvent may be used in a proportion of 50 mass % or less, preferably 30 mass % or less, and more preferably 10 mass % or less in the total solvent.

Examples of the organic solvent include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxyethane, bis(2-methoxyethyl) ether, 1,2-bis(2-methoxyethoxy)ethane, tetrahydrofuran, bis[2-(2-methoxyethoxy)ethyl] ether, 1,4-dioxane, dimethyl sulfoxide, dimethylsulfone, diphenyl ether, sulfolane, diphenylsulfone, tetramethylurea, anisole, m-cresol, phenol, and γ-butyrolactone.

As the imidazoles (compounds), compounds of the following chemical formula (5) may be suitably exemplified.

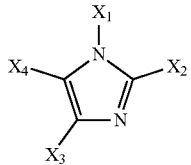

Chemical formula (5)

In chemical formula (5), $X_1$ to $X_4$ are each independently a hydrogen atom or an alkyl group having 1 to 5 carbon atoms.

The imidazole which is used in the present invention preferably has a solubility in water at 25° C. of 0.1 g/L or more, and especially 1 g/L or more.

Furthermore, among the imidazoles of chemical formula (5), an imidazole in which $X_1$ to $X_4$ are each independently a hydrogen atom or an alkyl group having 1 to 5 carbon atoms, and at least two of $X_1$ to $X_4$ are alkyl groups having 1 to 5 carbon atoms, namely, an imidazole having two or more alkyl groups as substituents, is more preferred.

Since the imidazole having two or more alkyl groups as substituents is high in solubility in water, the polyamic acid-containing solution can be easily produced with such an imidazole. As these imidazoles, 1,2-dimethylimidazole (its solubility in water at 25° C. is 239 g/L; hereinafter the same), 2-ethyl-4-methylimidazole (1,000 g/L), 4-ethyl-2-methylimidazole (1,000 g/L), and 1-methyl-4-ethylimidazole (54 g/L) are suitable. It is to be noted that the solubility in water at 25° C. means a critical amount (g) at which the instant material is dissolved in 1 L of water at 25° C. This value may be easily retrieved by SciFinder (registered trademark) that is known as a retrieval service based on data bases of Chemical Abstracts and the like. Here, among solubility under various conditions, values at a pH of 7 as calculated by Advanced Chemistry Development (ACD/Labs) Software V11.02 (Copy right 1994-2011 ACD/Labs) were adopted. The imidazole to be used may be a single material or may also be a mixture of two or more thereof.

The use amount of the imidazole is preferably 0.8 times equivalent or more, more preferably 1.0 times equivalent or more, and still more preferably 1.2 times equivalent or more based on the carboxyl groups of the polyamic acid, which is formed through the reaction between the tetracarboxylic dianhydride and the diamine that are starting materials. When the use amount of the imidazole is less than 0.8 times equivalent based on the carboxyl groups of the polyamic acid, there is a concern that it does not become easy to obtain a uniform a polyamic acid-containing solution. Although the upper limit of the use amount of the imidazole is not particularly limited, it is generally less than 10 times equivalent, preferably less than 5 times equivalent, and more preferably less than 3 times equivalent. When the use amount of the imidazole is too large, not only such is not economical, but also there is a concern that the storage stability of the polyamic acid-containing solution is deteriorated.

In the present invention, the "equivalent based on the carboxyl groups of the polyamic acid", which defines the amount of the imidazole, means the number (number of molecules) of the imidazole used per carboxyl group that is converted to an amic acid group of the polyamic acid. The number of carboxyl groups that is converted to amic acid groups of the polyamic acid is calculated on the assumption that two carboxyl groups would be formed per molecule of the tetracarboxylic dianhydride as the starting material. Accordingly, the use amount of the imidazole which is used in the present invention is preferably 1.6 times mole or more, more preferably 2.0 times mole or more, and still more preferably 2.4 times mole or more relative to the tetracarboxylic dianhydride as the starting material.

The feature of the imidazoles is not only to form a salt with a carboxyl group of the polyamic acid formed through the reaction between the tetracarboxylic dianhydride and the diamine that are starting materials, thereby increasing the solubility in water, but also to have an extremely high catalytic effect on the occasion of subjecting the polyamic acid to imidization (dehydration ring closure) to form a polyimide. Accordingly, when the binder composition for a secondary battery containing the imidazole is used, a polyimide binder having extremely good properties can be easily obtained, for example, even by a heat treatment at a lower temperature for a shorter time.

The binder composition for a secondary battery which comprises an organic solvent may preferably further comprise a pyridine compound, because the pyridine compound can reduce the degree of swelling of the resulting polyimide resin with respect to an electrolyte solution, can increase the breaking elongation and the breaking energy thereof, and makes it possible to lower the heat-treatment temperature for obtaining an electrode.

The pyridine compound is a compound having a pyridine skeleton in the chemical structure, and preferable examples thereof include pyridine, 3-pyridinol, quinoline, isoquinoline, quinoxaline, 6-tert-butyl quinoline, acridine, 6-quinoline carboxylic acid, 3,4-lutidine, and pyridazine. These pyridine compounds may be used alone or in combination of two or more thereof.

The addition amount of the pyridine compound may be preferably, but not limited to, from 0.05 molar equivalent to 2.0 molar equivalent, more preferably from 0.1 molar equivalent to 1.0 molar equivalent, relative to the amic acid structure in the polyamic acid (per mole of the amic acid structure). Outside this range is not preferable, because it is difficult in some cases to exert the effects that the pyridine compound reduces the degree of swelling of the resulting polyimide resin with respect to an electrolyte solution, increases the breaking elongation and the breaking energy thereof, and makes it possible to lower the heat-treatment temperature for obtaining an electrode.

(2) Secondary Battery

A secondary battery can be produced using the binder composition for a secondary battery. The binder composition for a secondary battery can be used in either a negative electrode or a positive electrode forming a secondary battery, but an embodiment in which the binder composition for a secondary battery is used in a negative electrode will be described as one aspect hereafter.

<Negative Electrode>

The negative electrode comprises a negative electrode current collector and a negative electrode active material layer which is provided on the negative electrode current collector and comprises a negative electrode active material and a negative electrode binder, and optionally a conductive assisting agent. In the present embodiment, the above described binder composition for a secondary battery is used as the negative electrode binder. The negative electrode active material layer can be formed by mixing a negative electrode active material and the binder composition for a secondary battery, and optionally a conductive assisting agent and a solvent to prepare an electrode mixture paste for a secondary battery, and applying this to a negative electrode current collector.

Examples of the negative electrode active material include metals capable of alloying with lithium, metal oxides capable of absorbing and desorbing lithium ions, carbon materials capable of absorbing and desorbing lithium ions, and the like.

Examples of the metal include Li, Al, Si, Pb, Sn, In, Bi, Ag, Ba, Ca, Hg, Pd, Pt, Te, Zn, La, alloys of two or more of these and the like. Two or more of these metals and alloys may be mixed and used. These metals and alloys may comprise one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as a negative electrode active material of the metal oxide, and silicon oxide is more preferably contained. This is because silicon oxide is relatively stable and is unlikely to trigger a reaction with other compounds. As silicon oxide, those represented by the composition formula $SiO_x$ ($0<x\leq2$) are preferred. Also, for example, 0.1 to 5 mass % of one or two or more elements selected from nitrogen, boron, and sulfur can be added to the metal oxide. In this way, the electroconductivity of the metal oxide can be enhanced.

The surface of the metal capable of alloying with lithium or the metal oxide capable of absorbing and desorbing lithium ions may be coated with carbon. Since the carbon coating can suppress the reaction with an electrolyte solution or polyamic acid, an electrode having high capacity and good cycle characteristics can be produced thereby. Examples of a carbon coating method include known methods such as mixing with a carbon material by a ball mill, thermal decomposition or vapor deposition of a carbon source.

Examples of the carbon material include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

In order to make use of the high mechanical strength of the binder composition for a secondary battery according to the present invention, it is preferable to use an active material which exhibits large expansion and contraction during charge and discharge among these negative electrode active materials. Examples of the active material which exhibits large expansion and contraction include Si alloys, Sn, silicon oxide, and tin oxide. In particular, silicon materials such as Si alloys and silicon oxide are preferred. This is because it is possible to make use of the advantage that the polyimide binder can prevent an active material layer from being damaged and peeling off from the current collector because of the expansion and contraction. In addition, a secondary battery excellent in energy density can be provided with these active materials. The amount of the silicon material is not particularly limited, and may be, for example, 10 mass % or more and may be 100 mass %, based on the total amount of the negative electrode active material.

In order to improve battery characteristics such as cycle characteristics, the electrode mixture paste for a secondary battery may contain the active materials which exhibit large expansion and contraction during charge and discharge in combination with other negative electrode active materials. For example, Si alloy or silicon oxide is preferably used in combination with a carbon material such as graphite. In addition, active material particles with carbon coating may be used to prevent damage to the active material caused by contact between the active material particles due to the expansion and contraction.

From the viewpoint of sufficient binding strength and high energy density being in a trade-off relation with each other, the amount of the polyamic acid contained in the binder composition for a secondary battery is preferably 0.5 to 50 parts by mass, and more preferably 0.5 to 30 parts by mass, based on 100 parts by mass of the negative electrode active material to be used. Polyamic acid is commercially available as a solution in some cases, but the mass of the polyamic acid here does not include the mass of components other than the polyamic acid, such as solvents.

Examples of the solvent contained in the electrode mixture paste for a secondary battery include conventional solvents used for polyimide binders. Examples of a nonaqueous solvent include dimethylformamide, N-methylpyrrolidone, and the like. In addition, the solvent may comprise water.

In the electrode mixture paste for a secondary battery, a conductive assisting agent may be additionally mixed for the purpose of lowering the impedance. Examples of the conductive assisting agent include, flake-like, soot, and fibrous carbon fine particles and the like, for example, carbon black, acetylene black, ketjen black, vapor grown carbon fibers and the like.

The electrode mixture paste for a secondary battery can be prepared by mixing the above described components. Then the electrode mixture paste for a secondary battery is applied to the negative electrode current collector and heat-treated, and thereby a negative electrode can be produced. Examples of a method of applying the electrode mixture paste for a secondary battery include a doctor blade method, a die coater method, a CVD method, a sputtering method, and the like.

As the negative electrode current collector on which the electrode mixture paste for a secondary battery is applied, from the view point of electrochemical stability, aluminum, nickel, copper, silver, tin, indium, magnesium, iron, chromium, molybdenum and alloys thereof are preferred. As the shape thereof, foil, flat plate, mesh and the like are exemplified.

The polyamic acid may be subjected to a dehydration ring closure reaction and converted to a polyimide through the heat treatment. The aromatic compound comprising an electron donating group and an organic acid group, contained in the binder composition for a secondary battery of the present invention, makes it possible for the reaction from polyamic acid to polyimide to proceed even at lower temperature. The heat treatment temperature is preferably less than 200° C., more preferably 180° C. or less, and still more preferably 150° C. or less. Also, to promote the reaction, the heat treatment temperature is preferably 50° C. or more, more preferably 80° C. or more, and still more preferably 90° C. or more. In order to prevent foaming or powdering, the heat treatment may be conducted in a multi-stage manner. The heat treatment may be conducted under any atmosphere of air, an inert gas such as nitrogen, and vacuum. The time for the heat treatment depends on temperature and the amount of the electrode mixture paste for a secondary battery, but may be preferably 1 minute or more and 24 hours or less, and more preferably 5 minutes or more and 5 hours or less. Volatile components such as the solvent in the electrode mixture paste for a secondary battery may be removed by the heat treatment. A dry process by heat or vacuum may be also provided before the heat treatment in order to remove the solvent in the electrode mixture paste for a secondary battery. After the heat treatment, a negative electrode active material layer, in which particles contained in the electrode mixture paste for a secondary battery, such as the active material, are bounded with the polyimide binder, is formed on the current collector, and a negative electrode can be obtained.

The polyamic acid represented by chemical formula (1) in the negative electrode active material layer is converted to a polyimide at least partially comprising a repeating unit represented by the following chemical formula (6) through the heat treatment.

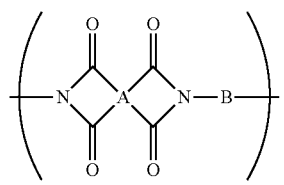

Chemical formula (6)

In chemical formula (6), A and B have the same meanings as A and B of chemical formula (1).

After the heat treatment, the polyamic acid structure may remain. In the polyimide contained in the electrode of the present invention after the heat-treatment, the ratio (imidization rate) of the number of the polyimide structures (that is, the repeating units represented by chemical formula (6)) to the total number of the polyamic acid structures (that is, the repeating units represented by chemical formula (1)) and the polyimide structures is preferably 50% or more, more preferably 80% or more, and particularly preferably 95% or more, and may be 100%. An electrode excellent in storage and cycle characteristics can be produced by adjusting the imidization rate within the above range. The imidization rate of the polyamic acid can be measured by $^1$H-NMR or FTIR.

The polyamic acid and the imidized polymer thereof may be used in combination. The use ratio of the polyamic acid and the imidized polymer thereof may be set arbitrarily as long as the imidization rate of the imidized polymer is within the above preferred range.

From the viewpoint of increasing capacity, it is better that the content of the polyamic acid and the polyimide in the negative electrode active material layer is low as long as the adhesive property is not impaired. The content of the polyamic acid and the polyimide in the negative electrode active material layer is preferably 50 mass % or less and more preferably 30 mass % or less. In order to obtain sufficient bonding strength to the negative electrode active material, the content of the polyamic acid and the polyimide in the negative electrode active material layer is preferably 0.5 mass % or more.

After the reaction from the polyamic acid to the polyimide, some or all of the aromatic compound contained in the binder composition for a secondary battery according to the present embodiment may remain in the active material layer, maintaining its structure. The upper limit of the content of the aromatic compound in the active material layer is preferably 60 mass % or less, and more preferably 40 mass % or less, and the lower limit is preferably 0.01 mass % or more, and more preferably 3 mass % or more with respect to the polyimide (including residual polyamic acid).

<Positive Electrode>

The positive electrode comprises a positive electrode current collector and a positive electrode active material layer which is provided on the positive electrode current collector and comprises a positive electrode active material and a positive electrode binder, and optionally a conductive assisting agent.

Examples of the positive electrode active material include lithium transition metal composite oxides. The positive electrode active material may be selected from several viewpoints. In terms of achieving high energy density, it is preferable to contain a high capacity compound. Examples of the high capacity compound include lithium nickelate ($LiNiO_2$) and lithium nickel composite oxides in which a part of Ni of lithium nickelate is replaced by another metal element, and layered lithium nickel composite oxides represented by the following formula (C) are preferred.

$Li_yNi_{(1-x)}M_xO_2$ (C)

wherein $0 \leq x < 1$, $0 < y \leq 1.2$, and M is at least one element selected from the group consisting of Co, Al, Mn, Fe, Ti, and B.

From the viewpoint of high capacity, it is preferred that the content of Ni is high, that is, x is less than 0.5, further preferably 0.4 or less in the formula (C). Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0<\alpha \leq 1.2$, preferably $1 \leq \alpha \leq 1.2$, $\beta+\gamma+\delta=1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.15}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (C). In addition, it is also preferred that particular transition metals do not exceed half. Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (C) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (C)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, $xLi_2MnO_3\text{-}(1\text{-}x)LiMO_2$ ($0.1<x<0.8$, M is one or more elements selected from the group consisting of Mn, Fe, Co, Ni, Ti, Al and Mg) and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having olivine structure such as $LiFePO_4$; and the like. In addition, materials in which these metal oxides are partially substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The positive electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamideimide and the like may be used. The binder composition for a secondary battery of the present invention may also be used as the positive electrode binder. Also, the positive electrode binder may be a mixture, a copolymer or a cross-linked body of a plurality of the above resins, for example, styrene butadiene rubber (SBR). When an aqueous binder such as an SBR emulsion is used, a thickener such as carboxymethyl cellulose (CMC) can also be used. The lower limit of the amount of the positive electrode binder is preferably 1 part by mass or more, and more preferably 2 parts by mass or more, and the upper limit is preferably 30 parts by mass or less, and more preferably 25 parts by mass or less, based on 100 parts by mass of the positive electrode active material.

For the coating layer comprising the positive electrode active material, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the positive electrode current collector, from the view point of electrochemical stability, aluminum, nickel, copper, silver, and alloys thereof are preferred. As the shape thereof, foil, flat plate, mesh and the like are exemplified. In particular, a positive electrode current collector using aluminum, an aluminum alloy, or iron-nickel-chromium-molybdenum based stainless steel is preferable.

The positive electrode may be prepared by forming the positive electrode active material layer comprising the positive electrode active material and the positive electrode binder on the positive electrode current collector. Examples of a method of forming the positive electrode active material layer include a doctor blade method, a die coater method, a CVD method, a sputtering method, and the like. It is also possible that after forming the positive electrode active material layer in advance, a thin film of aluminum, nickel or an alloy thereof as a positive electrode current collector is formed thereon by a method such as vapor deposition or sputtering.

<Electrolyte Solution>

The electrolyte solution of the secondary battery according to the present embodiment is not particularly limited, but is preferably a non-aqueous electrolyte solution containing a non-aqueous solvent and a supporting salt which are stable to operation potentials of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (MEC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; fluorinated aprotic organic solvents obtainable by substituting at least a part of hydrogen atoms of these compounds with fluorine atom(s); and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) or the like is preferably contained.

The non-aqueous solvents may be used alone, or in combination of two or more.

The supporting salt is not particularly limited except that it comprises Li. Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(FSO_2)_2$ (abbreviated as LiFSI), $LiN(CF_3SO_2)_2$, $LiN(C_2F_5SO_2)_2$, $LiB_{10}Cl_{10}$ and the like. Besides these, the supporting salt includes lower aliphatic lithium carboxylate, chloroboran lithium, lithium tetraphenylborate, LiBr, LiI, LiSCN, LiCl and the like. Among these, $LiPF_6$ and LiFSI are particularly preferred from the viewpoint of oxidation resistance, reduction resistance, stability and solubility. The supporting salts may be used alone or in combination of two or more. From the viewpoint of cost reduction, $LiPF_6$ is preferable. The amount of the supporting salt is preferably 0.4 mol or more and 1.5 mol or less, more preferably 0.5 mol or more and 1.2 mol or less with respect to 1 L of the non-aqueous solvent.

The electrolyte solution may further contain an additive. The additive is not particularly limited, and examples thereof include halogenated cyclic carbonates, unsaturated cyclic carbonates, cyclic or open-chain disulfonic acid esters, and the like. These compounds can improve battery characteristics such as cycle characteristics. This is presumably because these additives decompose during charge/discharge of the secondary battery to form a film on the surface of an electrode active material, which inhibits decomposition of the non-aqueous solvent and the supporting salt.

<Separator>

The separator may be of any type as long as it has durability against an electrolyte solution. Specific examples of a material include polyolefins such as polypropylene and polyethylene, cellulose, polyethylene terephthalate, polyimide, polyvinylidene fluoride, aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of the positive electrode, the negative electrode and the separator. Examples of a method for forming the insulation layer include a doctor blade method, a die coater method, a CVD method, a sputtering method, and the like. The insulation layer may be formed at the same time as forming the positive electrode, negative electrode or separator. Materials constituting the insulation layer include a mixture of an insulating filler such as aluminum oxide or barium titanate and a binder such as SBR or polyvinylidene fluoride.

<Structure of Secondary Battery>

Figure 2:
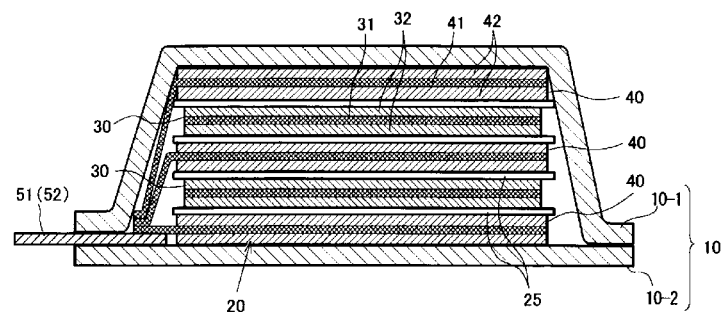
FIG. 2 is a cross-sectional view schematically showing a cross section of the battery of FIG. 1.

The secondary battery according to the present embodiment may have, for example, a structure as shown in FIGS. 1 and 2. This secondary battery comprises a battery element 20, a film outer package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film outer package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film outer package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Secondary Battery>

The secondary battery according to the present embodiment can be manufactured by a conventional method. An example of a method for manufacturing a secondary battery will be described taking a stacked laminate type secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

<Assembled Battery>

A plurality of the secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of the secondary batteries included in the assembled battery can be set appropriately according to the battery capacity and output.

<Vehicle>

The secondary battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as trucks and buses, light automobiles, etc.), two-wheeled vehicle (bike) and tricycle), and the like. The vehicles according to the present embodiment are not limited to automobiles, and it may be a variety of power source of other vehicles, such as a moving body like a train.

EXAMPLES

Abbreviations for compounds used in Examples and Comparative examples are as follows.

<Tetracarboxylic Dianhydride>
PMDA: Pyromellitic dianhydride
BPDA: 3,3',4,4'-Biphenyltetracarboxylic dianhydride
ODPA: Bis(3,4-dicarboxyphenyl)ether dianhydride
DNDAxx: (4arH,8acH)-Decahydro-1t,4t:5c,8c-dimethanonaphthalene-2t,3t,6c,7c-tetracarboxylic dianhydride
CpODA: Norbornane-2-spiro-α-cyclopentanone-α'-spiro-2''-norbornane-5,5'',6,6''-tetracarboxylic dianhydride <Diamine>
NBDA: Norbornanediamine
14BAC: 1,4-Bis (aminomethyl)cyclohexane (trans-isomer ratio 84%)
CHDA: 1,4-Cyclohexanediamine (trans-isomer ratio 99% or more)
ODA: 4,4'-Diaminodiphenylether
DABAN: 4,4'-Diaminobenzanilide <Solvent>
DMAc: N,N-Dimethylacetamide
NMP: N-Methyl-2-pyrrolidone <Synthetic Example 1 of Polyamic Acid>

Into a 500 mL five-neck separable flask equipped with a thermometer, a stirring device and a nitrogen introducing tube, 5.71 g (0.050 mol) of CHDA, 7.11 g (0.050 mol) of 14BAC and 230 g of DMAc were added with stirring to prepare a solution of a diamine mixture. With stirring, into that solution, 31.0 g (0.100 mol) of ODPA in the form of powder was introduced, and then the resultant liquid was bathed in oil bath kept at 90° C. for 1 hour to allow reaction to proceed. The liquid, which was ununiform at the beginning, turned into a transparent solution with the progress of the reaction. Then it was diluted with NMP to obtain a solution containing 15 mass % of a polyamic acid.

<Synthetic Example 2 of Polyamic Acid>

Into a 300 mL five-neck separable flask equipped with a thermometer, a stirring device, a nitrogen introducing tube and a dropping funnel, 14.01 g (0.099 mol) of 14BAC, 1.7 g (0.011 mol) of NBDA and 189 g of DMAc were added and stirred. Into that mixed solution, 29.1 g (0.099 mol) of BPDA and 2.4 g (0.011 mol) of PMDA in the form of powder were added. After the addition of BPDA and PMDA, the reaction vessel was bathed in oil bath kept at 120° C. for 5 minutes. A salt precipitated three minutes after the addition of BPDA and PMDA, but dissolved immediately thereafter. That mixture was further stirred at room temperature for 18 hours and diluted with NMP to obtain a solution containing 9 mass % of a polyamic acid.

<Synthetic Example 3 of Polyamic Acid>

Into a 300 mL five-neck separable flask equipped with a thermometer, a stirring device, a nitrogen introducing tube and a dropping funnel, 39.7 g (0.180 mol) of PMDA and 130 g of DMAc were added and stirred to prepare PMDA slurry. Also, a mixed solution of 27.8 g (0.180 mol) of NBDA and 27.8 g of DMAc was prepared. That mixed solution was dropped into the slurry over 120 minutes while keeping the temperature constant. Then the mixture was stirred at 50° C. for 5 hours and diluted with NMP to obtain a solution containing 9 mass % of a polyamic acid.

<Synthetic Example 4 of Polyamic Acid>

4.54 g (0.020 mol) of DABAN was placed in a reaction vessel which was purged with nitrogen gas, and 44.34 g of DMAc was added thereto such that the total mass of the charged monomers (the sum of the diamine components and the carboxylic acid components) would be 20 mass %, and the mixture was stirred at room temperature for 1 hour. Into that solution, 4.24 g (0.014 mol) of DNDAxx and 2.30 g (0.006 mol) of CpODA were gradually added. The solution was stirred at room temperature for 12 hours, and then diluted with DMAc to obtain a solution containing 9 mass % of a polyamic acid.

<Synthetic Example 5 of Polyamic Acid>

Into a 300 mL five-neck separable flask equipped with a thermometer, a stirring device and a nitrogen introducing tube, 10.0 g (0.050 mol) of ODA and 119 g of DMAc were added and stirred. Into that mixed solution, 10.9 g (0.050 mol) of PMDA in the form of powder was added while keeping the temperature constant. Then the mixed solution was stirred at 50° C. for 5 hours and diluted with NMP to obtain a solution containing 9 mass % of a polyamic acid.

Examples 1 to 2 and Comparative Examples 1 to 2

(Production of Electrode)

A composite having an average particle diameter D50% of 8 μm, in which the surface of $SiO_x$ was covered with a carbon material (the amount of the carbon material in the composite was 7 mass %), the polyamic acid solution of Synthetic example 1 (polyamic acid: 15 mass %) and an additive shown in Table 1 were respectively weighed at a mass ratio of 50:33:x (0.23 or 0). These were kneaded with N-methylpyrrolidone (NMP) to prepare a slurry. The amount of water in the slurry was 200 to 300 ppm. The slurry was applied to a 10 μm thick stainless steel foil using a doctor blade. Then it was heated at 120° C. for 5 minutes to remove NMP by dry. Then it was heated at 140° C. for 1 hour under reduced pressure. An active material layer was formed on the stainless steel foil, and this was stamped into a circular shape having a diameter of 12 mm to produce an electrode.

(Production of Battery)

The produced electrode and a counter electrode of Li metal were layered via an olefin-based separator to produce a model cell, in which EC/DEC/EMC=3/5/2 (volume ratio) containing 1 M of $LiPF_6$ was used as an electrolyte solution.

(Evaluation of Battery)

A charge and discharge test and a cycle test of the produced model cell were performed at 25° C. In the charge and discharge test, charge and discharge were performed twice in a current density of 0.3 $mA/cm^2$ in a voltage range of 0.03 to 1.0 V. The quantity of electricity flowed from the start until the end of charging or discharging was defined as the charge capacity or the discharge capacity, and the second charge capacity (corresponding to the amount of lithium desorption from the silicon-based electrode) was defined as 1C. The 1C capacity per mass of the $SiO_x$ composite in the electrode of Reference example 1 below, which did not comprise the additive and was treated at 270° C., was taken to be 100, and the 1C capacity ratio of an electrode was determined.

In the cycle test, the model cell after the charge and discharge test was subjected to 50 cycles in each of which the model cell was discharged at 0.3 C to 0.03 V, discharged at a constant voltage for 4 hours in total and then charged at a constant current of 0.3 C to 1.0 V. The proportion of the discharge capacity after 50 cycles to the initial discharge capacity (corresponding to the amount of lithium desorption from the silicon-based electrode) was determined as capacity retention ratio. 1C capacity ratio and the average value (unit: %, the number of measurements: 2 or more) of capacity retention ratios after 50 cycles are shown in Table 1.

Reference Example 1

An electrode was produced and evaluated in the same manner as in Comparative example 1 except that the heat treatment conditions for the electrode were changed to 270° C. for 2 hours under nitrogen gas (flow rate: 70 L/min).

TABLE 1

Table 1. Evaluation results of electrodes treated at 140° C.
(in Reference example 1, treated at 270° C.)

|   |   | Reference example 1 | Comparative example 1 | Comparative example 2 | Example 1 | Example 2 |
|---|---|---|---|---|---|---|
|   | Additive | — | — | Benzoic acid | p-Methyl benzoic acid | p-Hydroxy benzoic acid |
|   | Addition amount (x) | — | — | 0.23 | 0.23 | 0.23 |
| A | 1 C capacity ratio | 100 | 93 | 91 | 89 | 95 |
| B | Capacity retention ratio after 50 cycles at 25° C. (%) | 76 | 68 | 67 | 81 | 77 |
|   | A × B/100 | — | 63 | 61 | 72 | 73 |

Example 3 and Comparative Example 3

(Production of Electrode)

A composite having an average particle diameter D50% of 8 μm, in which the surface of $SiO_x$ was covered with a carbon material (the amount of the carbon material in the composite: 7 mass %), the polyamic acid solution of Synthetic example 2 (polyamic acid: 9 mass %) and an additive shown in Table 1 were respectively weighed at a mass ratio of 50:55:x (0.23 or 0). These were kneaded with N-methylpyrrolidone (NMP) to prepare a slurry. The amount of water in the slurry was 200 to 300 ppm. The slurry was applied to a 10 μm thick stainless steel foil using a doctor blade. Then it was heated at 120° C. for 5 minutes to remove NMP by dry. Then it was heated at 140° C. for 1 hour under reduced pressure. An active material layer was formed on the stainless steel foil, and this was stamped into a circular shape having a diameter of 12 mm to produce an electrode.

(Production of Battery)

The produced electrode and a counter electrode of Li metal were layered via an olefin-based separator to produce a model cell, in which EC/DEC/EMC=3/5/2 (volume ratio) containing 1 M of $LiPF_6$ was used as an electrolyte solution.

(Evaluation of Battery)

A charge and discharge test and a cycle test of the produced model cell were performed at 25° C. In the charge and discharge test, charge and discharge were performed twice in a current density of 0.3 mA/cm$^2$ in a voltage range of 0.03 to 1.0 V. The quantity of electricity flowed from the start until the end of charging or discharging was defined as the charge capacity or the discharge capacity, and the second charge capacity (corresponding to the amount of lithium desorption from the silicon-based electrode) was defined as 1C. The 1C capacity per mass of the $SiO_x$ composite in the electrode of Reference example 2 below, which did not comprise the additive and was treated at 270° C., was taken to be 100, and the 1C capacity ratio of an electrode was determined.

In the cycle test, the model cell after the charge and discharge test was subjected to 50 cycles in each of which the model cell was discharged at 0.3 C to 0.03 V, discharged at constant voltage for 4 hours in total and then charged at a constant current of 0.3 C to 1.0 V. The proportion of the discharge capacity after 50 cycles to the initial discharge capacity (corresponding to the amount of lithium desorption from the silicon-based electrode) was determined as capacity retention ratio. 1C capacity ratio and the average value (unit: %, the number of measurements: 2 or more) of capacity retention ratios after 50 cycles are shown in Table 2.

Reference Example 2

An electrode was produced and evaluated in the same manner as in Comparative example 3 except that the heat treatment conditions for the electrode were changed to 270° C. for 2 hours under nitrogen gas (flow rate: 70 L/min).

TABLE 2

Evaluation results of electrodes treated at 140° C.
(in Reference example 2, treated at 270° C.)

| | | Reference example 2 | Comparative example 3 | Example 3 |
|---|---|---|---|---|
| | Additive | — | — | p-Hydroxy benzoic acid |
| | Addition amount (x) | — | — | 0.23 |
| A | 1 C capacity ratio | 100 | 94 | 96 |
| B | Capacity retention ratio after 50 cycles at 25° C. (%) | 81 | 55 | 80 |
| | A × B/100 | — | 52 | 77 |

Example 4 and Comparative Example 4

Electrodes were respectively produced and evaluated in the same manner as in Example 3 and Comparative example 3 except that the polyamic acid solution of Synthetic example 3 was used as the binder raw material. The 1C capacity per mass of the $SiO_x$ composite in the electrode which did not comprise the additive and was treated at 270° C. (Reference example 3 of Table 3) was taken to be 100, and the 1C capacity ratio of an electrode was determined. The results are shown in Table 3.

Reference Example 3

An electrode was produced and evaluated in the same manner as in Comparative example 4 except that the heat treatment conditions for the electrode were changed to 270° C. for 2 hours under nitrogen gas (flow rate: 70 L/min). The results are shown in Table 3.

TABLE 3

Evaluation results of electrodes treated at 140° C.
(in Reference example 3, treated at 270° C.)

| | | Reference example 3 | Comparative example 4 | Example 4 |
|---|---|---|---|---|
| | Additive | — | — | p-Hydroxy benzoic acid |
| | Addition amount (x) | — | — | 0.23 |
| A | 1 C capacity ratio | 100 | 93 | 95 |
| B | Capacity retention ratio after 50 cycles at 25° C. (%) | 81 | 55 | 80 |
| | A × B/100 | — | 51 | 76 |

Example 5 and Comparative Example 5

Electrodes were respectively produced and evaluated in the same manner as in Example 3 and Comparative example 3 except that the polyamic acid solution of Synthetic example 4 was used as the binder raw material. The 1C capacity per mass of the $SiO_x$ composite in the electrode which did not comprise the additive and was treated at 350° C. (Reference example 4 of Table 4) was taken to be 100, and the 1C capacity ratio of an electrode was determined. The results are shown in Table 4.

Reference Example 4

An electrode was produced and evaluated in the same manner as in Comparative example 5 except that the heat treatment conditions for the electrode were changed to 350° C. for 2 hours under nitrogen gas (flow rate: 70 L/min). The results are shown in Table 4.

TABLE 4

Evaluation results of electrodes treated at 140° C.
(in Reference example 4, treated at 350° C.)

| | | Reference example 4 | Comparative example 5 | Example 5 |
|---|---|---|---|---|
| | Additive | — | — | p-Hydroxy benzoic acid |
| | Addition amount (x) | — | — | 0.23 |
| A | 1 C capacity ratio | 100 | 89 | 92 |
| B | Capacity retention ratio after 50 cycles at 25° C. (%) | 77 | 47 | 76 |
| | A × B/100 | — | 42 | 70 |

As shown in Tables 1 to 4, there was a correlation between the presence/absence of the additive and the capacity of the silicon based negative electrode after 50 cycles (A×B in the tables). The addition of a benzoic acid derivative was effective in improving the capacity retention ratio of the electrode heat-treated at 140° C. In addition, as shown in Tables 2 to 4, the same effect was confirmed even if the polyamic acid has a different molecular structure.

Examples 6 to 7 and Comparative Example 6 to 7

(Production of Electrode)

A nickel negative electrode terminal for drawing electric charge was welded to each of the electrodes of Examples 1 to 2 and Comparative examples 1 to 2.

Lithium cobalt oxide (made by Nichia Corporation), carbon black (3030B: made by Mitsubishi Chemical Corporation) and polyvinylidene fluoride (made by Kureha Corporation) were weighed at a mass ratio of 95:2:3, and these solid components and NMP were mixed at a mass ratio of 5248 using a homogenizer to prepare a slurry. The slurry was applied to a 15 μm thick aluminum foil using a doctor blade and heated at 120° C. for 5 minutes to remove N-methyl-2-pyrrolidone, so that a positive electrode was produced. An aluminum positive electrode terminal for drawing electric charge was welded to the positive electrode.

(Production of battery)

The above positive electrode and negative electrode were stacked via a separator to produce an electrode element. The resulting electrode element was packaged with a laminate film, and an electrolyte solution was injected thereto. Subsequently, the laminate film was heat-sealed and sealed while the pressure was reduced, and a flat plate type lithium ion secondary battery was fabricated. A polypropylene film was used as the separator. An aluminum-deposited polypropylene film was used as the laminate film. A mixed solution of ethylene carbonate and diethyl carbonate at a volume ratio of 3:7 containing 1.0 mol/L of $LiPF_6$ was used as the electrolytic solution.

(Evaluation of Battery)

The resulting flat plate type lithium ion secondary battery was subjected to charge/discharge in the range of 4.2 V to 2.7 V under a 25° C. environment using a charge/discharge tester (ACD-100M: made by ASKA Electronics Co. Ltd.). The charge was performed in a CCCV mode in which the battery was charged at a constant current of 1C up to 4.2V and at a constant voltage for 1 hour after voltage reached 4.2V. The discharge was performed in a CC mode in which the battery was discharged at a constant current of 1C, and the initial discharge capacity was measured. As used herein, 1 C means a constant current value which is constantly released from a fully charged battery to finish discharge for 1 hour. In this way, 100 cycles of charge/discharge were performed, and the discharge capacity at the 100th cycle was measured. The ratio of the discharge capacity at the 100th cycle to the initial discharge capacity (100dc/1dc) was calculated. The results are shown in Table 5.

Reference Example 5

The same evaluation was conducted except that the electrode of Reference example 1 was used as the negative electrode. The results are shown in Table 5.

TABLE 5

Evaluation results of electrodes treated at 140° C.
(in Reference example 5, treated at 270° C.)

| | Reference example 5 | Comparative example 6 | Comparative example 7 | Example 6 | Example 7 |
|---|---|---|---|---|---|
| Additive | — | — | Benzoic acid | p-Methyl benzoic acid | p-Hydroxy benzoic acid |
| Addition amount (x) | — | — | 0.23 | 0.23 | 0.23 |
| 100 dc/1 dc (%) | 96 | 63 | 67 | 91 | 92 |

Example 8, Comparative Example 8 and Reference Example 6

The electrode of Example 3 was used as the negative electrode of Example 8, the electrode of Comparative example 3 was used as the negative electrode of Comparative example 8, and the electrode of Reference example 2 was used as the negative electrode of Reference example 6. Except for these, the evaluation was conducted in the same manner as in examples of Table 5. The results are shown in Table 6.

TABLE 6

Evaluation results of electrodes treated at 140° C.
(in Reference example 6, treated at 270° C.)

| | Reference example 6 | Comparative example 8 | Example 8 |
|---|---|---|---|
| Additive | — | — | p-Hydroxy benzoic acid |

TABLE 6-continued

Evaluation results of electrodes treated at 140° C.
(in Reference example 6, treated at 270° C.)

|  | Reference example 6 | Comparative example 8 | Example 8 |
|---|---|---|---|
| Addition amount (x) | — | — | 0.23 |
| 100 dc/1 dc (%) | 98 | 66 | 94 |

Example 9, Comparative Example 9 and Reference Example 7

The electrode of Example 4 was used as the negative electrode of Example 9, the electrode of Comparative example 4 was used as the negative electrode of Comparative example 9, and the electrode of Reference example 3 was used as the negative electrode of Reference example 7. Except for these, the evaluation was conducted in the same manner as in examples of Table 5. The results are shown in Table 7.

TABLE 7

Evaluation results of electrodes treated at 140° C.
(in Reference example 7, treated at 270° C.)

|  | Reference example 7 | Comparative example 9 | Example 9 |
|---|---|---|---|
| Additive | — | — | p-Hydroxy benzoic acid |
| Addition amount (x) | — | — | 0.23 |
| 100 dc/1 dc (%) | 99 | 68 | 95 |

Example 10

(Production of Negative Electrode)

Silicon monoxide having an average particle diameter D50% of 25 μm (made by Kojundo Chemical Laboratory Co., Ltd.), carbon black (3030B made by Mitsubishi Chemical Corporation), the polyamic acid solution of Synthetic example 1, and p-hydroxy benzoic acid were weighed at a mass ratio of 83:2:14:1 in terms of solid content, and these were mixed with DMAc using a homogenizer to form a slurry. The slurry was applied to a 10 μm thick stainless steel foil using a doctor blade and then heated at 120° C. for 7 minutes to remove DMAc. Thereafter, this was heated at 150° C. for 1 hour under reduced pressure to produce a negative electrode. A nickel negative electrode terminal for drawing electric charge was welded to the negative electrode.

(Production of battery)

A positive electrode produced in the same manner as in Example 6 was placed on the above negative electrode with a separator interposed therebetween to produce an electrode element. The fabricated electrode element was packaged with a laminate film, and an electrolyte solution was injected thereto. Subsequently, the laminate film was thermally fused and sealed while the pressure was reduced, and a flat plate type lithium ion secondary battery was fabricated. A polypropylene film was used as the separator. An aluminum-deposited polypropylene film was used as the laminate film. A mixed solution of ethylene carbonate and diethyl carbonate at a volume ratio of 3:7 containing 1.0 mol/L of $LiPF_6$ was used as the electrolytic solution.

(Evaluation of Battery)

The resulting flat plate type lithium ion secondary battery was subjected to charge/discharge in the range of 4.2 V to 2.7 V under a 25° C. environment using a charge/discharge tester (ACD-100M: made by ASKA Electronics Co. Ltd.). The charge was performed in a CCCV mode in which the battery was charged at a constant current of 1C up to 4.2V and at a constant voltage for 1 hour after voltage reached 4.2V. The discharge was performed in a CC mode in which the battery was discharged at a constant current of 1C, and the initial discharge capacity was measured. As used herein, 1 C means a constant current value which is constantly released from a fully charged battery to finish discharge for 1 hour. In this way, 150 cycles of charge/discharge were performed, and the discharge capacity at the 150th cycle was measured. The ratio of the discharge capacity at the 150th cycle to the initial discharge capacity (150dc/1dc) was calculated. The results are shown in Table 8.

Comparative Example 10

The same evaluation was conducted in the same manner as in Example 10 except that the polyamic acid solution of Synthetic example 1 was changed to the polyamic acid solution of Synthetic example 5. The results are shown in Table 8.

TABLE 8

Evaluation results of electrodes treated at 150° C.

| Composition of polyamic acid | | Example 10 | Comparative example 10 |
|---|---|---|---|
| Tetracarboxylic acid component | PMDA (mol %) | 100 | 100 |
| Diamine component | NBDA (mol %) | 100 | |
|  | ODA (mol %) | | 100 |
| 150 dc/1 dc (%) | | 87 | 46 |

From Table 8, it can be seen that the polyimide used in Example 10, prepared from an aromatic tetracarboxylic dianhydride and an alicyclic diamine, imparted better battery properties after heat treatment at low temperature than the polyimide used in Comparative example 10, prepared from an aromatic tetracarboxylic dianhydride and an aromatic diamine. It is thought that an aliphatic group contained in a repeating unit improves the binder performance, and the effect thereof was more remarkably demonstrated in the case of the heat treatment at low temperature.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The binder composition for a secondary battery and the secondary battery according to the present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF SYMBOLS

10 film outer package 20 battery element 25 separator 30 positive electrode 40 negative electrode

The invention claimed is:

1. A binder composition for a secondary battery, the binder composition comprising:
   a polyamic acid comprising a repeating unit represented by formula (1); and
   an aromatic compound having one and only one electron donating group, and an organic acid group,

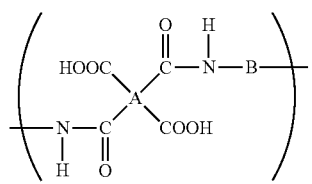

formula (1)

wherein, in the formula (1), A is a tetravalent group obtained by removing acid anhydride groups from a tetracarboxylic dianhydride, B is a divalent group obtained by removing amino groups from a diamine, and at least one of A and B is an aliphatic group.

2. The binder composition for a secondary battery according to claim 1, wherein the aliphatic group comprises a ring.

3. The binder composition for a secondary battery according to claim 1, wherein the aliphatic group comprises a cyclohexane ring.

4. The binder composition for a secondary battery according to claim 1, wherein one of A and B is an aromatic group.

5. The binder composition for a secondary battery according to claim 1, wherein the organic acid group is selected form the group consisting of carboxyl group, sulfo group, and phosphate group, and the electron donating group is selected from the group consisting of alkyl group, alkoxy group, amino group, hydroxyl group, mercapto group and alkylthio group.

6. A secondary batter, comprising:
   a negative electrode comprising,
      a polyimide comprising a repeating unit represented by formula (6); and
      an aromatic compound comprising one and only one electron donating group, and an organic acid group,

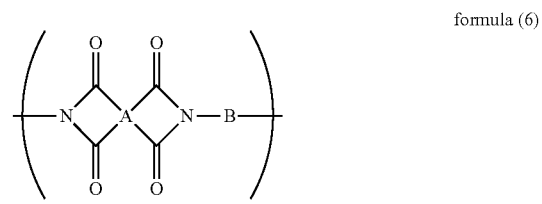

formula (6)

wherein, in the formula (6), A is a tetravalent group obtained by removing acid anhydride groups from a tetracarboxylic dianhydride, B is a divalent group obtained by removing amino groups from a diamine, and at least one of A and B is an aliphatic group.

7. A secondary battery according to claim 6, wherein the negative electrode comprises a silicon material.

8. The secondary battery according to claim 6, comprising a positive electrode comprising a lithium transition metal composite oxide.

9. A method for manufacturing an electrode for a secondary battery, the method comprising:
   secondary battery by mixing:
      a polyamic acid comprising a repeating unit represented by formula (1),
      an aromatic compound having one and only one electron donating group and an organic acid group,
      a silicon material, and
      a solvent applying the electrode mixture paste to a current collector, and
   treating the current collector at a temperature of 150° C. or less to react the polyamic acid to a polyimide,

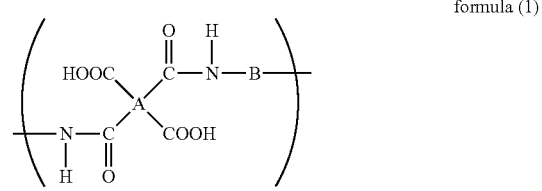

formula (1)

wherein, in formula (1), A is a tetravalent group obtained by removing acid anhydride groups from a tetracarboxylic dianhydride, B is a divalent group obtained by removing amino groups from a diamine, and at least one of A and B is an aliphatic group.

* * * * *